United States Patent
Hurst

(10) Patent No.: US 7,203,290 B2
(45) Date of Patent: Apr. 10, 2007

(54) MONITORING USAGE OF TELECOMMUNICATIONS SERVICES

(75) Inventor: Michael Hurst, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 348 days.

(21) Appl. No.: 10/234,670

(22) Filed: Sep. 4, 2002

(65) Prior Publication Data
US 2003/0072425 A1 Apr. 17, 2003

(30) Foreign Application Priority Data
Oct. 15, 2001 (EP) ................... 01308769

(51) Int. Cl.
*H04M 15/00* (2006.01)
(52) U.S. Cl. .................. 379/115.01; 379/114.01; 379/114.03; 379/114.28; 379/126; 379/133
(58) Field of Classification Search .................. 379/34, 379/32.01, 134, 133, 35, 126, 114.01, 114.03, 379/115.01, 114.28; 455/405, 406
See application file for complete search history.

(56) References Cited

U.S. PATENT DOCUMENTS

| | | | |
|---|---|---|---|
| 5,592,530 A | 1/1997 | Brockman et al. ............ 379/34 |
| 6,249,572 B1 | 6/2001 | Brockman et al. ........... 379/133 |
| 6,359,976 B1* | 3/2002 | Kalyanpur et al. .......... 379/134 |
| 6,539,082 B1* | 3/2003 | Lowe et al. ............ 379/114.28 |
| 7,106,849 B2* | 9/2006 | Baratz et al. ........... 379/221.08 |
| 2002/0118813 A1* | 8/2002 | Brehm et al. ................ 379/229 |
| 2004/0132449 A1* | 7/2004 | Kowarsch ................ 455/432.1 |

FOREIGN PATENT DOCUMENTS

WO    WO 01/20920 A1    3/2001

* cited by examiner

*Primary Examiner*—Barry Taylor

(57) ABSTRACT

Call detail records are generated for usage of a telecommunications service established in a telecommunications network, by monitoring messages in a signalling system for co-ordinating operation of the network and carried over signalling links in the signalling system between a service switching function entity and a service control function entity. Messages are selected that relate to instances of usage of the telecommunications service initiated by the service switching function entity to at least one signal switching point in the network. These selected messages are correlated in accordance with the usage instance to which they relate, and information in the correlated selected messages is used to derive a call detail record for an instance of usage of the telecommunications service.

11 Claims, 17 Drawing Sheets

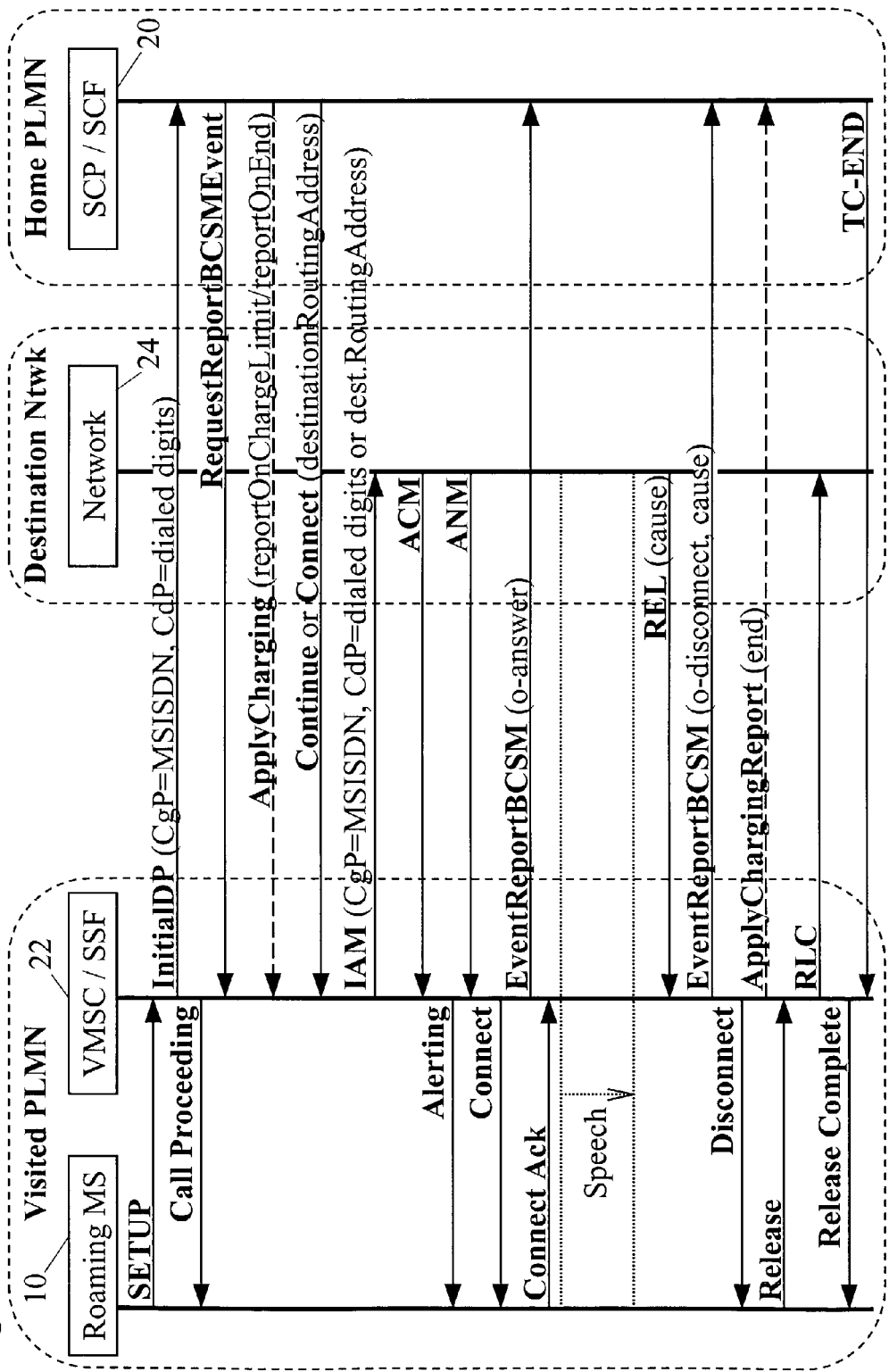

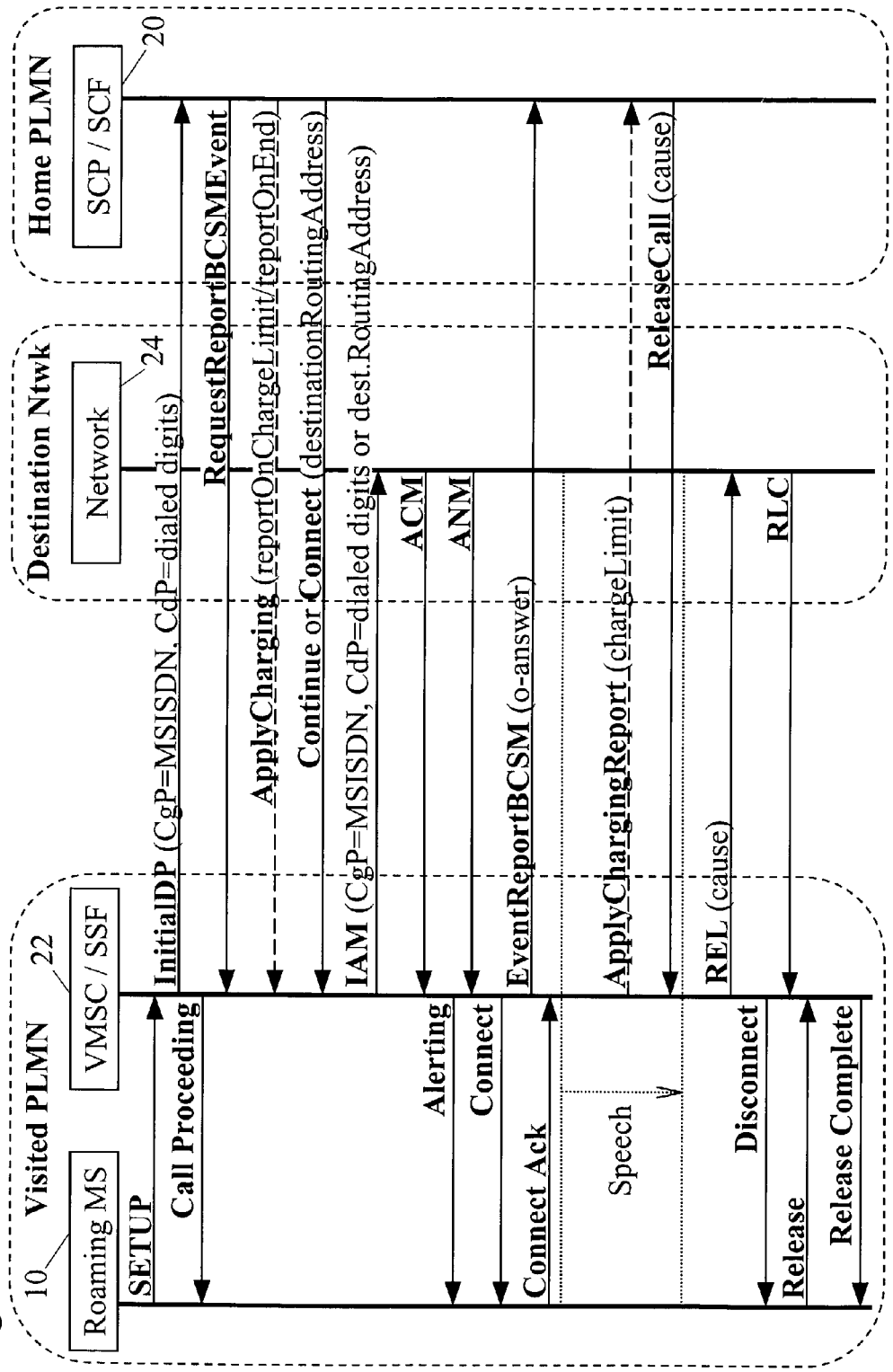
Fig. 3 Simplified protocol with clearing by home network (credit limit reached)

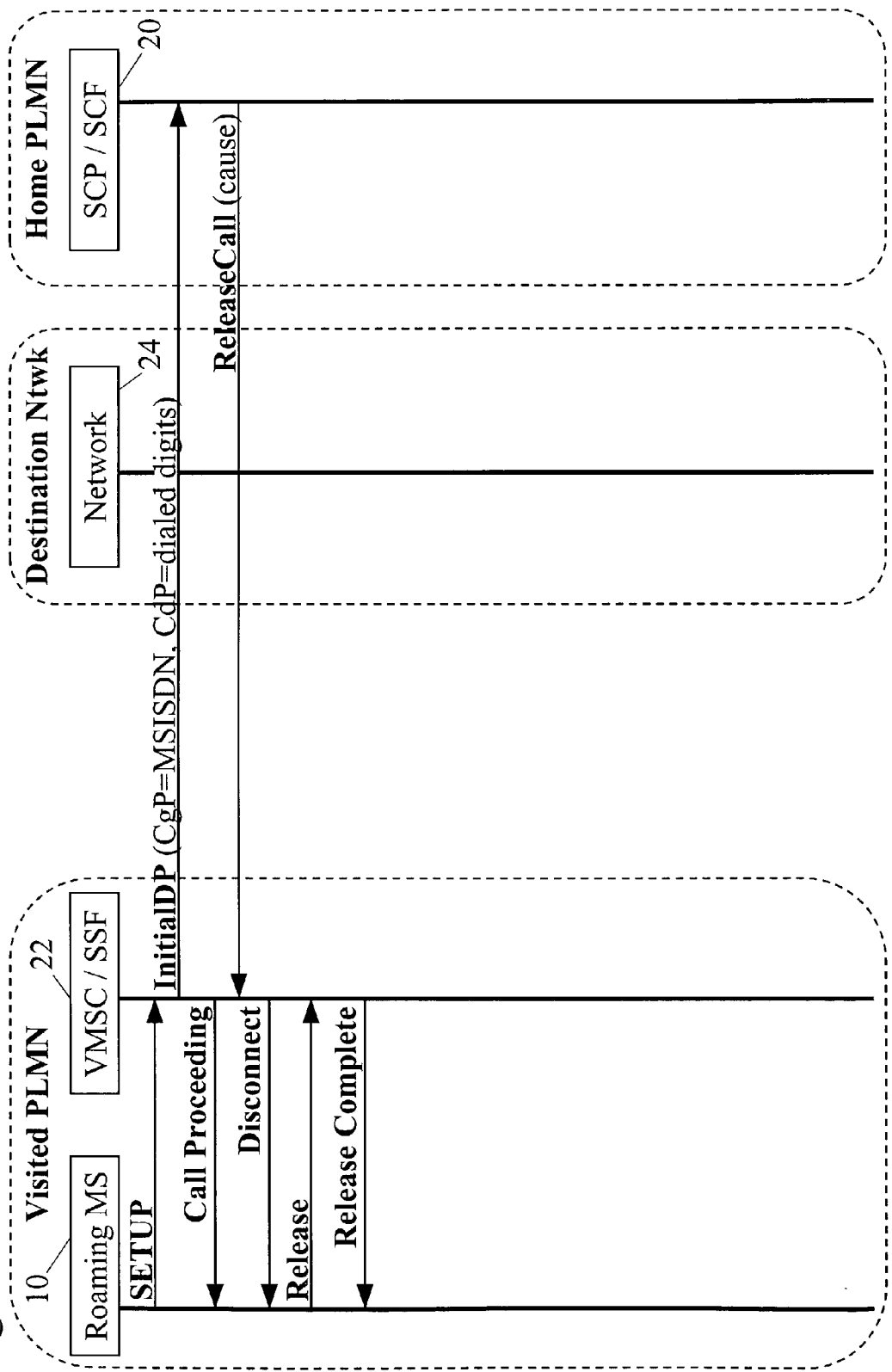

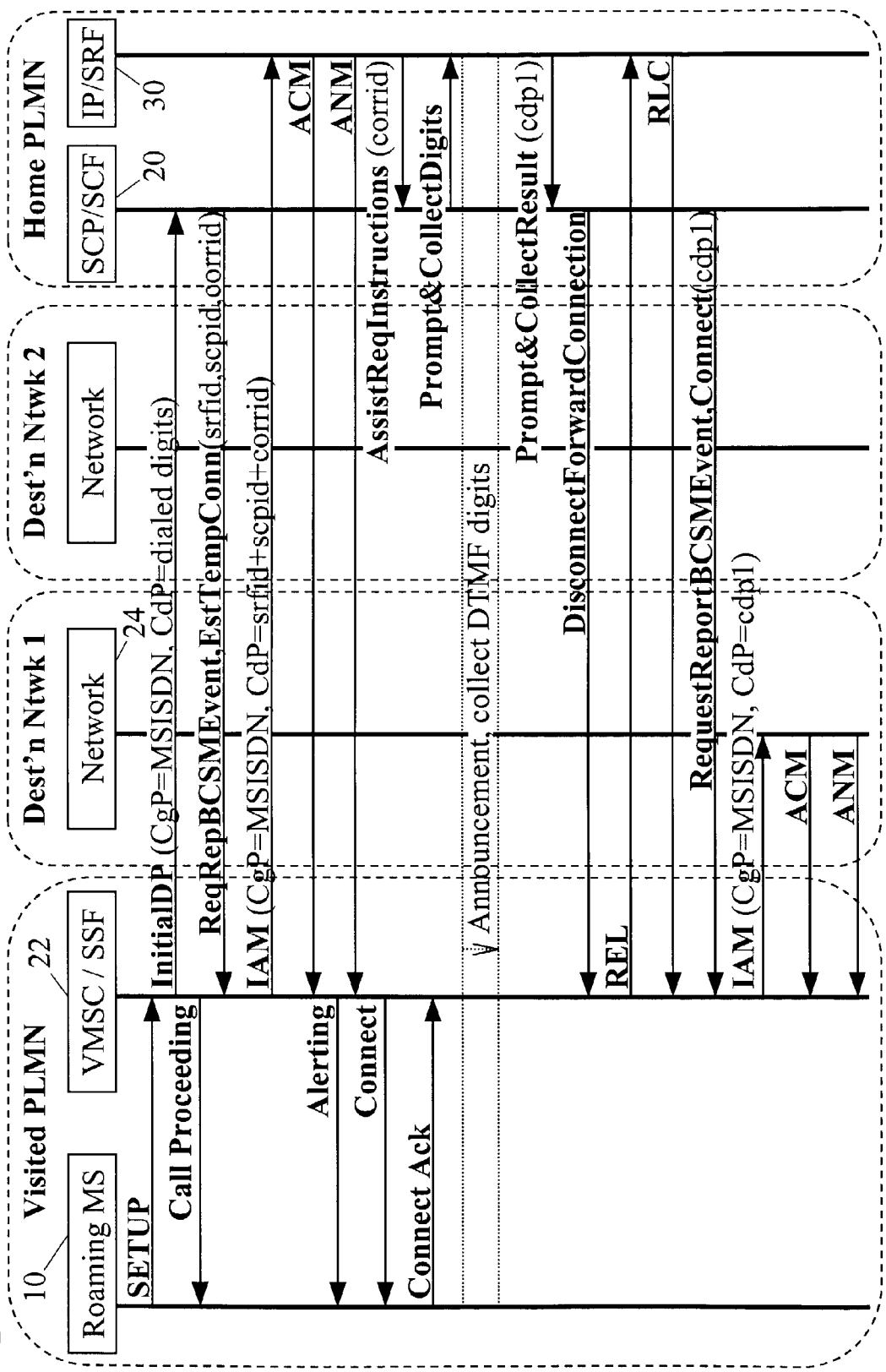
Fig. 5a  Simplified protocol with multiple calls within single CAMEL transaction

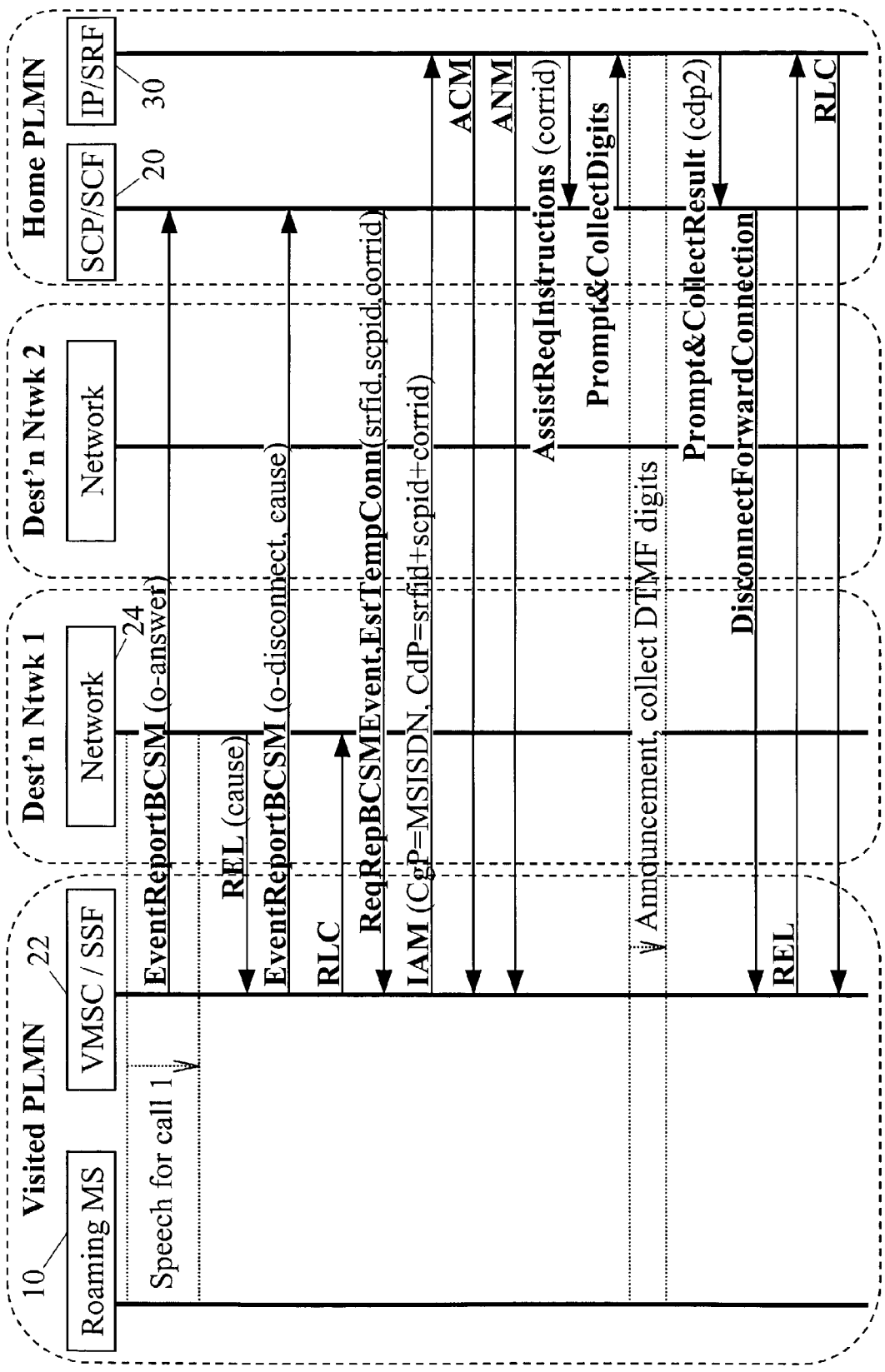
Fig. 5b  Simplified protocol with multiple calls within single CAMEL transaction (cont.)

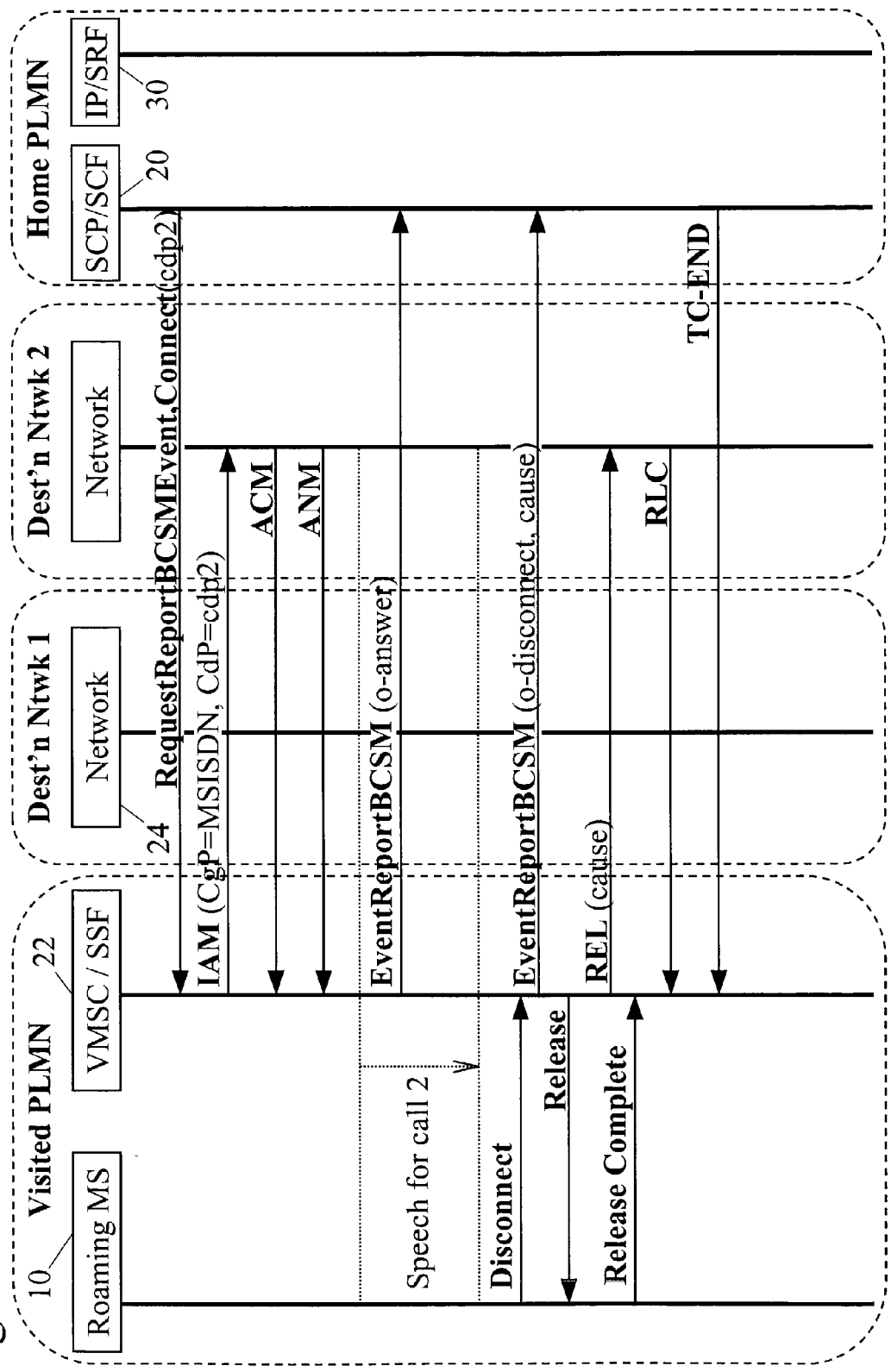

Fig.6 process CorrelateTCAPMSUs

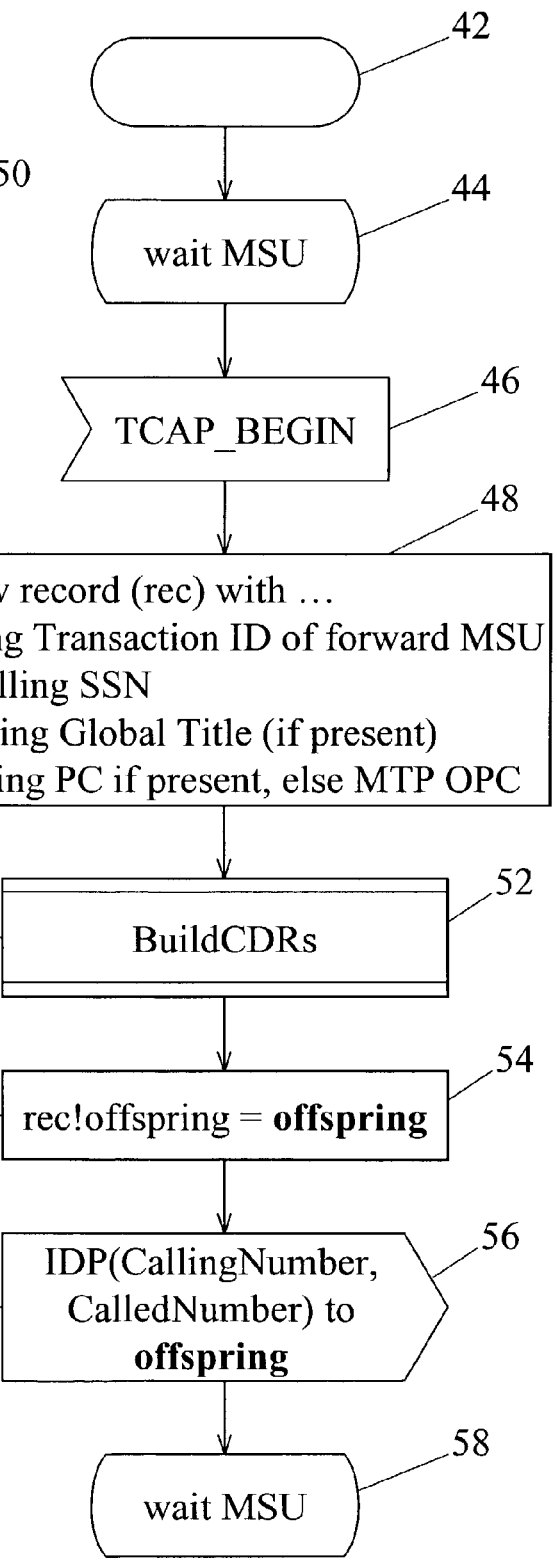

```
newtype a_tcap_record struct
  origTID integer;
  origSSN integer;
  origGT charstring;
  origPC integer;
  destTID integer;
  destSSN integer;
  destGT charstring;
  destPC integer;
  offspring Pld;
endnewtype a_tcap_record;
```
— 50

48 — Create new TCAP follow record (rec) with ...
rec!origTID = Originating Transaction ID of forward MSU
rec!origSSN = SCCP Calling SSN
rec!origGT = SCCP Calling Global Title (if present)
rec!origPC = SCCP Calling PC if present, else MTP OPC Create new instance of BuildCDRs process ---- 52 BuildCDRs Save BuildCDRs instance ID with the TCAP follow record ---- 54 rec!offspring = offspring

Passing Calling and Called Number in the IDP to the BuildCDRs instance ---- 56 IDP(CallingNumber, CalledNumber) to offspring

58 wait MSU

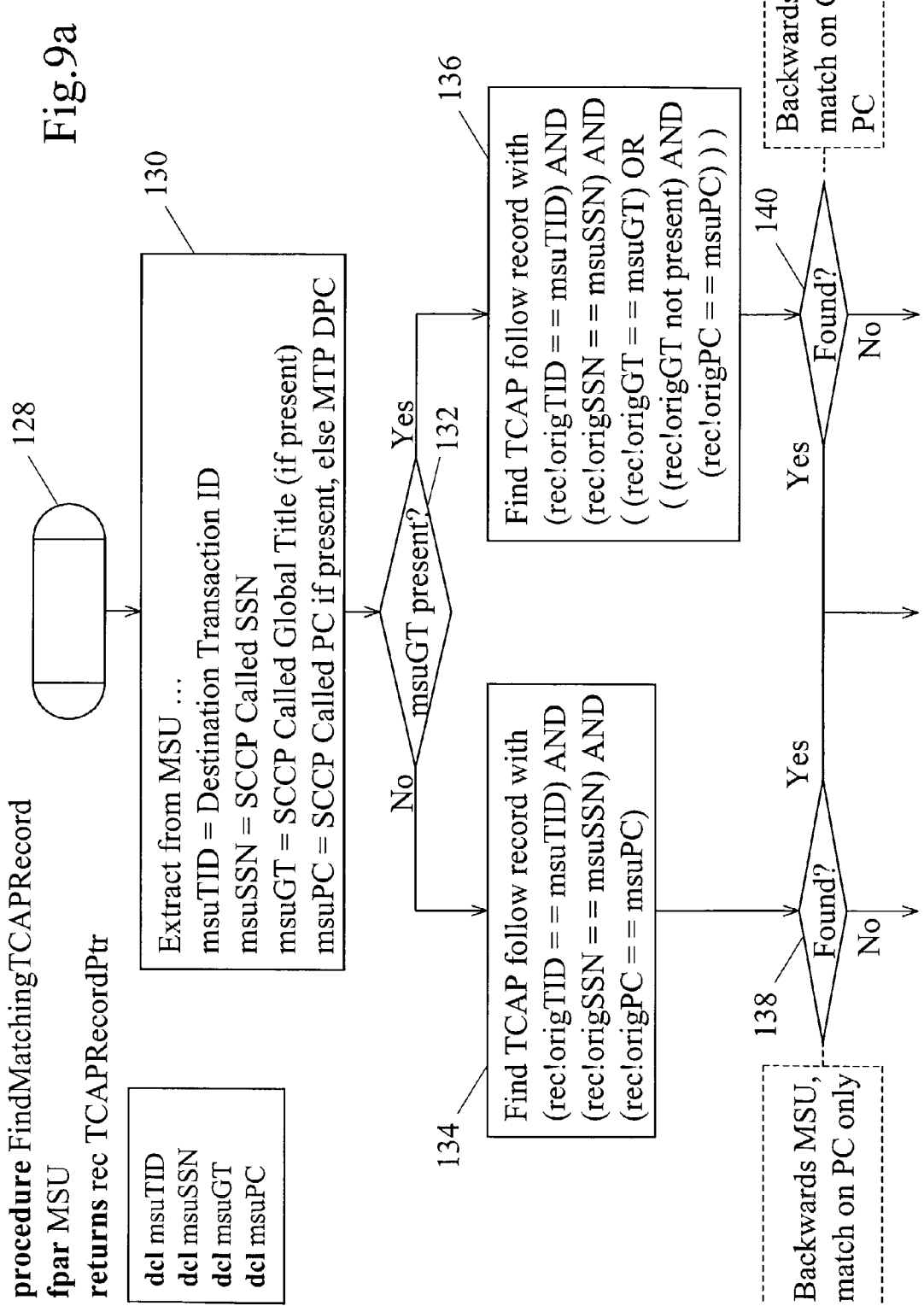

process BuildCDRs

MONITORING USAGE OF TELECOMMUNICATIONS SERVICES

TECHNICAL FIELD

This invention relates to monitoring of use of roaming mobile communications devices, and in particular to generation of call detail records for telecommunications calls established by a mobile telecommunications device via a visited communications network other than a home communications network for the mobile device.

BACKGROUND ART

Wireless communication networks such as Global System for Mobile communications (GSM) allow subscribers of one Public Land Mobile Network (PLMN) to roam into the coverage area of other PLMNs (for example in different countries) and make telephone calls while via those other networks. Historically in most cases two call 'legs' have been required to set up a roaming call for a pre-paid subscriber—one leg between the visited PLMN (VPLMN) and the home network, and a second call leg to the called party. In the case of post-paid subscribers the call may be routed back to the home network before being forwarded to the called party or it may go straight to the called party without traversing the home PLMN (HPLMN), unless of course the call is to another subscriber in the HPLMN.

Routing a mobile originated call back to the home network before forwarding it to the called party is expensive on resources. However a majority of mobile originated calls are to networks (wireline or mobile) other than the home network. So routing roaming calls via the home network uses a costly international trunk that may be unnecessary. A mobile subscriber roaming in a VPLMN in a foreign country and making a 'local' call within that country (for example to request a taxi) will nonetheless incur two international call legs. Until recently this inflexibility has been passed on to subscribers as high call charges for international roaming. However GSM networks are now starting to introduce roaming services facilitated by the use of Customised Applications for Mobile network Enhanced Logic (CAMEL). Various phases of CAMEL implementation are described in, for example, ETSI documents TS 101 285 (GSM 02.78) and TS 122 078 (3GPP TS 22.078).

CAMEL features allow the VPLMN switch handling the call request from the mobile station to suspend call processing after collecting the dialled digits and to contact the HPLMN for instructions on how to proceed with the call, for example using Service Switching Function (SSF) facilities associated with the switch. This interaction with the HPLMN is accomplished with messages sent via the Signalling System no.7 (SS7) signalling network, using CAMEL Application Part (CAP) protocol over the Transaction Capabilities Application Part (TCAP) protocol defined in the SS7 standards. This does not require a voice trunk. The HPLMN may then validate the call attempt (e.g. to confirm the subscriber has credit) and perform possible number translation (e.g. to convert short dial codes into telephone numbers) before instructing the originating VPLMN switch how to proceed with processing the call. For these purposes information will usually be extracted by a Service Control Function (SCF) entity in the HPLMN from databases in a Service Control Point (SCP) in the HPLMN's SS7 network. Typically the call will then be routed directly to the called party, avoiding any unnecessary call legs and trunk usage via the HPLMN. 'Event detection points' may be defined in the instructions from the HPLMN to cause event reports to be sent to the HPLMN during progress of the call, e.g. when the called party answers.

One advantageous characteristic for network operators of switching mobile roaming calls via the HPLMN for routing is that it is possible to assemble a call detail record (CDR) for each call instance by monitoring the SS7 signalling network links in the HPLMN and collecting ISDN User Part (ISUP) Message Signal Units (MSUs) relating to that call. These MSUs, such as the Initial Address Message, enable parameters of the call such as calling party, called party and duration to be readily correlated for billing and other purposes.

When CAMEL features are used the HPLMN will not have access to any ISUP MSUs for the call (unless the call is to another subscriber in the HPLMN). This means that an SS7 monitoring system cannot build CDRs for these mobile originated calls. Indeed no information about the existence of the call may be available to the HPLMN until billing records are exchanged between the two PLMNs. For example, although an SCP in the HPLMN's SS7 system will be aware of the existence of such calls as a result of its CAMEL protocol interactions with VPLMNs, this information is generally not available in real time to other HPLMN systems for fraud management, billing verification, call performance monitoring or customer care. Hence a way of assembling CDRs similar to those obtained from ISUP MSUs but actually derived otherwise, in order to feed data to these other systems, will be of value. An analogous requirement is envisaged to assemble CDRs for instances of usage of other telecommunications services, without access to signaling directly associated with implementing the service transport or delivery.

DISCLOSURE OF INVENTION

According to one aspect of this invention there is provided a method of generating a call detail record for usage of a telecommunications service established in a telecommunications network, comprising the steps of:

monitoring messages in a signalling system for co-ordinating operation of the network and carried over signalling links in the signalling system between a service switching function entity and a service control function entity;

selecting messages that relate to instances of usage of a telecommunications service initiated by the service switching function entity to at least one signal switching point in the network;

correlating selected messages in accordance with the usage instance to which they relate; and using information in the correlated selected messages to derive a call detail record for an instance of usage of the telecommunications service.

A service switching function (SSF) entity is one which provides a set of functions required for interaction between a call control function (CCF, which establishes, manipulates and releases calls or connections) and a service control function (SCF) entity. As described in ITU-T Recommendation Q.1204 published by the International Telecommunication Union, an SSF performs tasks such as extending the logic of the CCF to include recognition of service control triggers and to interconnect with the SCF, managing signalling between the CCF and the SCF, and modifying call/connection processing functions as required to process requests for specialised services provided under control of the SCF. As also described in that document, an SCF performs tasks such as commanding call control functions involved in processing of such specialised services, and contains logic and processing capability required to handle these services. The terms "service switching function" or SSF and "service control function" or SCF are used herein to refer to entities which provide functions such as those described in ITU-T Recommendation Q.1204 in the context of so-called Intelligent Networks, or which provide comparable functions in the context of other systems for providing comparable communications facilities.

According to another aspect of this invention there is provided apparatus for generating a call detail record for usage of a telecommunications service established in a telecommunications network, comprising:

a monitor for monitoring messages in a signalling system for co-ordinating operation of the network and carried over signalling links in the signalling system between a service switching function entity and a service control function entity;

a message selector for selecting messages that relate to instances of usage of a telecommunications service initiated by the service switching function entity to at least one signal switching point in the network;

a correlator for correlating selected messages in accordance with the usage instance to which they relate; and a call detail record generator for using information in the correlated selected messages to derive a call detail record for an instance of usage of the telecommunications service.

BRIEF DESCRIPTION OF DRAWINGS

A method and apparatus in accordance with this invention, for assembling CDRs for roaming mobile calls established using CAMEL features, will now be described, by way of example, with reference to the accompanying drawings, in which:

FIG. 2 is a simplified protocol diagram for a call originated by a roaming mobile subscriber and established using CAMEL features, and cleared by the called party;

FIG. 3 is a simplified protocol diagram similar to that shown in FIG. 2, but with the call being cleared by the subscriber's home network;

FIG. 4 is a simplified protocol diagram similar to that shown in FIG. 2, but with the call being prohibited by the subscriber's home network;

FIGS. 5a, 5b and 5c together comprise a simplified protocol diagram similar to that shown in FIG. 2, for the case where the subscriber is using a Mobile Virtual Private Network (MVPN) and makes multiple calls without going on hook between each call;

FIGS. 6, 7, 8a and 8b are Specification and Description Language (SDL) diagrams defining a TCAP MSU correlation process useful in implementing the present invention;

FIGS. 9a and 9b together comprise an SDL diagram defining a procedure for finding matching TCAP records which is invoked by the TCAP MSU correlation process.

BEST MODE FOR CARRYING OUT THE INVENTION, & INDUSTRIAL APPLICABILITY

Figure 1:
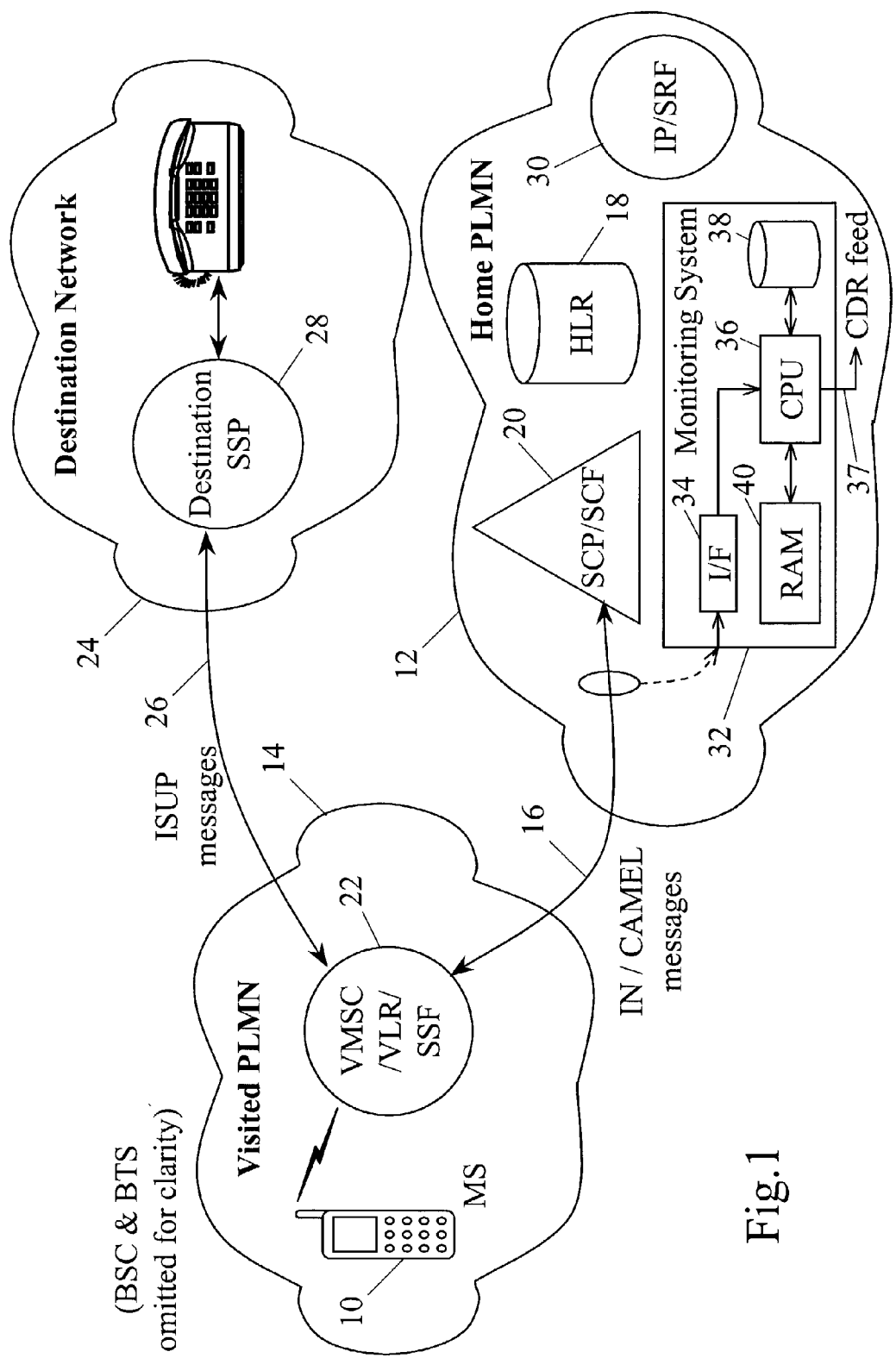
FIG. 1 is a schematic illustration of the principal mechanisms involved in establishing a roaming mobile call.

Referring to FIG. 1, the invention will be described in the context of calls made by a user of a mobile station (MS) 10, such as a mobile phone, which is associated with a home GSM PLMN 12, while the user is roaming within the coverage area of a different (visited) PLMN 14 for example in a different country. When the user enters the area of the VPLMN 14 that network informs the HPLMN 12 with a Mobile Application Protocol (MAP) operation message via an SS7 link 16 carrying such MAP and other messages (including CAMEL messages or operations). The HPLMN 12 responds with another MAP operation containing Originating CAMEL Subscription Information (O-CSI), and possibly other data, extracted from a Home Location Register (HLR) 18 in the HPLMN 12. This O-CSI comprises:

the address of an SCF entity, typically an SCP 20 in the HPLMN 12;

a Service Key for identifying service logic within the SCP 20 that implements the service;

one or more trigger detection points (TDPs) identifying the point(s) where interaction with an SCF is required, by reference to a Basic Call State Model (BCSM) which provides a standardised, formal representation of the progress and state of a call;

criteria for triggering or not triggering at the TDP—e.g. dialled digits or telephone number lengths to be matched; and default instructions for handling a call in case of a CAMEL failure.

The VPLMN 14 stores the received information in a Visited Location Register (VLR) associated with a Visited Mobile Switching Centre (VMSC) including an SSF entity 22. As will be understood by those skilled in the art, entities such as the SCF/SCP 20 and the VMSC/SSF 22 typically comprise data processing and related equipment operating under the control of software programs which define the required characteristics and functions of those entities. A description of the capabilities of and relationship between the SSF 22 and the SCF 20 is given, for example, in the ITU-T Recommendation referred to above.

The CAMEL protocol (in simplified form) for establishing a call that the user wishes to make to a subscriber of a third, destination telecommunications network 24 is shown in FIG. 2. Each major protocol step is indicated by an arrow extending between vertical lines corresponding to the entities involved in that step and identified at the head of each line. The arrows are directed towards the entity receiving the relevant protocol message or operation, and the temporal occurrence of protocol steps is depicted by their position down the page.

The user dials the number of the desired subscriber, and this information is transmitted in known manner from the mobile phone 10 to a base transceiver station (BTS) and base station controller (BSC)—both not shown—in the VPLMN 12. The BSC forwards the information within the VPLMN to the VMSC/SSF 22 (SETUP message in FIG. 2). When the VMSC/SSF 22 has received all the dialled digits the specified TDP is encountered, and in accordance with the O-CSI information stored in the VLR it suspends processing of the call and sends a CAMEL Initial Detection Point (Initial_DP) operation in a TCAP message via the link 16 to the SCP/SCF 20 in the HPLMN 12. This operation contains the phone number (mobile station ISDN number) of the caller and the requested called number.

The SCP/SCF 20 determines whether to allow the call (for example by reference to the user's credit status) and if the outcome is positive it responds with a CAMEL RequestReportBCSMEvent operation, which informs the VMSC/SSF 22 that the HPLMN requires to be informed of specified events that may occur during the progress of the call, such as when the call is answered and later terminated. The VMSC/SSF 22 uses this information to set up event detection points in the BCSM for the call. If desired by the operator of the HPLMN 12, an ApplyCharging operation may also be sent to the VMSC/SSF 22, to cause the VMSC/SSF to meter the call for charging and apply an optional charge limit. The SCP/SCF 20 then sends either a Continue operation, telling the VMSC/SSF 22 to use the number as dialled by the user, or a Connect operation, to route the call to a different number (destinationRoutingAddress) specified in the operation.

Thereafter the VMSC/SSF 22 attempts to set up the call by sending a normal SS7 Initial Address Message (IAM, as defined for example in ISUP, Telephone User Part—TUP or Interconnect User Part—IUP) over an SS7 link 26 to the destination network 24. There the IAM is routed to the appropriate Signal Switching Point (SSP) 28 associated with the called subscriber's switch. The SSP 28 responds with an Address Complete Message (ACM), followed by an Answer Message (ANM) when the called subscriber answers. The VMSC/SSF 22 in turn informs the MS 10 of progress, with appropriate messages and information such as ringing tones for the subscriber.

When event detection points are encountered that were specified by the SCP/SCF 20 in the HPLMN 12 (such as the called subscriber answering the phone), the VMSC/SSF 22 sends corresponding EventReportBCSM operations to the SCP/SCF 20. At the end of the call (in the case shown, when the called subscriber hangs up) a Release (REL) message is sent by the SSP 28 to the VMSC/SSF 22, which sends another EventReportBCSM operation to the SCP/SCF 20, indicating that the call has ended, and a Disconnect message to the MS 10. If an ApplyCharging operation was sent earlier by the SCP/SCF 20, the VMSC/SSF 22 will now respond with an ApplyChargingReport operation providing requested charging data. The MS 10 sends a release message to the VMSC/SSF 22, which in turn transmits a Release Complete (RLC) message to the SSP 28 in the destination network 24. In the example shown the SCP/SCF 20 in the HPLMN 12 then explicitly ends the TCAP transaction which began with the Initial_DP operation, by sending a TC-END operation to the VMSC/SSF 22.

FIG. 3 shows the CAMEL protocol for a similar call, which is ended by the HPLMN 12 when an ApplyChargingReport operation is sent during the call by the VMSC/SSF 22 to the SCP/SCF 20, indicating that the user's charge limit (specified in a preceding ApplyCharging operation) has been exceeded. The SCP/SCF 20 responds to this information with a ReleaseCall operation, which in turn prompts an exchange of REL and RLC messages between the VMSC/SSF 22 and the SSP 28 in the destination network 24 to terminate the call.

FIG. 4 shows the CAMEL protocol for the case where the HPLMN 12 prohibits the call from being placed, e.g. because the user's credit is insufficient. In this case the Initial_DP operation described earlier is immediately answered with a ReleaseCall operation from the SCP/SCF 20.

If the user has access to a mobile virtual private network (MVPN) by dialling an access code, then she may have the option of placing multiple calls via that MVPN without re-dialling the access number for each call. The CAMEL protocol for this situation is shown in FIGS. 5*a* to 5*c*. Additional functionality in the HPLMN 12 is involved, in the form of an Intelligent Peripheral/Service Resource Function (IP/SRF) 30, which together with the SCP/SCF 20 provides the MVPN service. The Initial_DP operation containing the access number entered by the user evokes a RequestReportBCSMEvent operation as in the previous examples, but it is accompanied in this case by an EstablishTemporaryConnection operation including information identifying the SCP/SCF 20, the IP/SRF 30 and the current CAMEL session. The following IAM from the VMSC/SSF is routed to the IP/SRF 30 in the HPLMN 12, and contains the MVPN service data as the called party number. A temporary speech connection is established between the roaming MS 10 and the IP/SRF 30, using ACM and ANM messages, and these are followed by a CAMEL AssistRequestInstructions operation addressed to the SCP/SCF 20 by the IP/SRF 30 and containing a correlation ID identifying this particular CAMEL session. The SCP/SCF 20 responds with details of an announcement that is to be played to the user of the MS 10 by the IP/SRF 30, and after which the IP/SRF receives the telephone number of the first subscriber the user wishes to call. The digits of this number are forwarded by the IP/SRF 30 to the SCP/SCF 20, which terminates the temporary connection with a DisconnectForwardConnection operation and then sends another RequestReportBCSMEvent operation to the VMSC/SSF 22, together with a Connect operation specifying the number to be called. The VMSC/SSF 22 then establishes the call by means of IAM, ACM and ANM messages exchanged with the destination network of the called subscriber.

When the first called subscriber hangs up (top of FIG. 5*b*), the first call is cleared and the SCP/SCF 20 is notified by a CAMEL EventReportBCSM operation. The SCP/SCF 20 responds with another pair of RequestReportBCSMEvent and EstablishTemporaryConnection operations directed to the VMSC/SSF 22, to create another temporary connection between the IP/SRF 30 and the MS 10. This connection enables the telephone number of the second subscriber, in another destination network, to be obtained, whereupon the SCP/SCF 20 terminates the temporary connection and sends a RequestReportBCSMEvent and Connect operation pair to the VMSC/SSF 22. The VMSC/SSF in turn establishes the second call by means of IAM, ACM and ANM messages exchanged with the second network. When the user of the MS 10 hangs up, the voice circuit is released and the CAMEL connection is ended as in the previous examples.

As noted above, it is desirable for the operator of the HPLMN 12 to be able to monitor the creation and progress of calls in real time or close to real time, for purposes such as fraud management, billing verification, call performance monitoring and customer care. However, the use of CAMEL features presents an obstacle to achieving this objective using existing techniques for assembling CDRs, such as by monitoring messages traversing the network operator's own SS7 signalling network. This is because many of the essential sources of information for a complete CDR, such as IAM, ACM, ANM, REL and RLC messages, do not enter the SS7 network of the operator of the HPLMN 12 when CAMEL is used, but instead pass directly from the VPLMN 14 to the destination network 24 (see for example FIG. 2).

FIGS. 6 to 12*a* and 12*b* together show, in the form of simplified SDL diagrams, processes and procedures for analysing messages defining CAMEL operations, to assemble in accordance with this invention respective CDRs for calls established in one or more CAMEL sessions.

To this end, a monitoring system 32 is provided in the HPLMN 12 for passively monitoring the link 16 carrying CAMEL messages between the networks. In an actual installation it may be necessary to monitor multiple links, and this can be done either at the point where the HPLMN is interconnected to other networks, or at the SCP/SCF 20. The monitoring is passive in the sense that the operation of the link 16 is undisturbed by the presence of the monitoring system 32, which simply makes copies of some or all of the message packets it observes traversing the link. The system 32 is coupled to the link 16 in such a way that the operating characteristics of the link 16 are not altered. In the case of an optical link, for example, the coupling may comprise an optical power splitter and for an electrical link it may be a bridging isolator.

The monitoring system 32 has an input interface 34 which receives and conditions the signal received from the coupling to the link 16, and supplies it to a processor/CPU 36 operating under the control of software program instructions in a program store 38 and using a random access store 40. The processor 36 extracts messages from the signal and performs some initial processing (e.g. error checking and preliminary decoding). The messages are subsequently analysed by the processor 36 as described below to provide a data feed 37 of CDRs to other applications (not shown), or alternatively may be forwarded via a communications link (e.g. a local area network, not shown) to a control centre (not shown) for further analysis and generation of CDRs. The apparatus for coupling to the link 16, and for extracting and storing messages contained in the signal obtained from the link, may comprise for example components of acceSS7 system equipment available from Agilent Technologies for monitoring messages traversing SS7 networks.

The method shown by way of example in FIGS. 6 to 12a and 12b for analysing the received messages comprises a process CorrelateTCAPMSUs for identifying MSUs containing CAMEL operations which relate to the same call or calls. This process in turn invokes a procedure FindMatchingTCAPRecord which determines whether an MSU relates to a TCAP transaction which is already being followed, and a process BuildCDRs which assembles each required CDR using information extracted from MSUs which have been matched and thus identified as relating to the same TCAP transaction. These processes and procedures will now be described in more detail. In the course of this description reference is made to 'forward' and 'backward' MSUs. A forward MSU is one transmitted from the equipment which initiates a TCAP connection with an Initial_DP operation (e.g. the VMSC/SSF 22 in the VPLMN 14 in the examples of FIGS. 2 to 5b), and a backward MSU is returned to that equipment by the equipment which receives that Initial_DP operation MSU (e.g. the SCP/SCF 20 in the HPLMN 12). Both forward and backward MSUs contain various fields with the same names, such as originating transaction ID (TID), calling Subsystem Number (SSN), calling Global Title (GT) and calling Point Code (PC). In the case of a forward MSU the terms originating and calling refer to the equipment which initiated the TCAP connection (such as the VMSC/SSF 22), whereas for a backward MSU they refer to the equipment which responded to initiation of the connection (such as the SCP/SCF 20), and inversely for the terms destination and called.

Referring to FIG. 6, when the CorrelateTCAPMSUs process is started (as indicated at 42) it enters a state 44 of awaiting receipt of the next MSU to be examined. Specifically the part of the process shown in FIG. 6 is awaiting an MSU indicating that a TCAP transaction has begun (that is, an Initial_DP operation). When such an MSU (represented at 46 by TCAP_BEGIN) is received the process advances to a task 48 where a record for following the progress of that TCAP transaction and storing its parameters is created. The structure of this record is defined in the declarations at 50 for the CorrelateTCAPMSUs process.

The record structure includes the signalling connection control part (SCCP) addressing information and TCAP transaction IDs associated with the CAMEL session:

origTID holds the TCAP Transaction ID allocated by the originating VMSC/SSF;

origSSN holds the CAMEL subsystem number at the originating VMSC/SSF;

origGT holds the SCCP Global Title of the originating VMSC/SSF (if present in the protocol);

origPC holds the SCCP Point Code of the originating VMSC/SSF (if present in the protocol); if the originating VMSC/SSF does not provide an SCCP Point Code in the SS7 signalling then origPC holds the message transfer part (MTP) originating point code (OPC) of the originating VMSC/SSF;

destTID holds the TCAP Transaction ID allocated by the destination SCF;

destSSN holds the CAMEL subsystem number at the destination SCF;

destGT holds the SCCP Global Title of the destination SCF (if present in the protocol);

destPC holds the SCCP Point Code of the destination SCF (if present in the protocol); if the destination SCF does not provide an SCCP Point Code in the SS7 signalling then destPC holds the MTP OPC of the destination SCF.

The originating TID and the calling SSN, GT and PC or OPC found in the TCAP_BEGIN MSU are copied into the relevant fields in the new record.

The CorrelateTCAPMSUs process then creates an instance of the BuildCDRs process (described below with reference to FIGS. 10, 11, 12a and 12b) as indicated at 52, and a link between that instance of the process and the new TCAP record is established at 54. At 56 the BuildCDRs instance is provided with the calling and called numbers which were included in the TCAP_BEGIN (Initial_DP) operation. Finally at 58 this part of the process returns to the awaiting MSU state.

Other kinds of MSU which may become available are TCAP_END (e.g. see FIG. 2), TCAP_ABORT and TCAP_CONTINUE MSUs. The functions performed by the process for TCAP_END and TCAP_ABORT MSUs are shown in FIG. 7.

Figure 7:
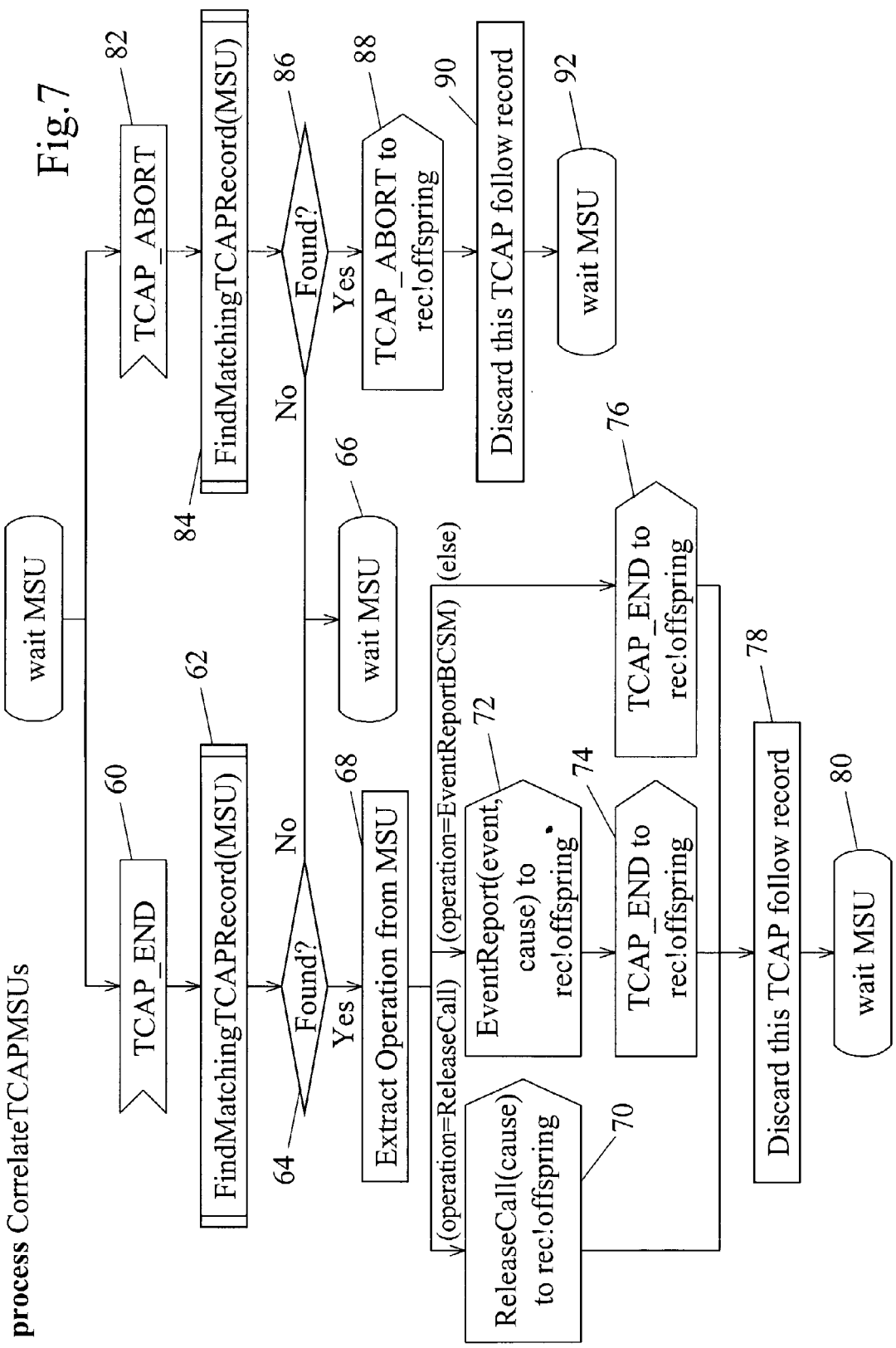
Figure 9B:
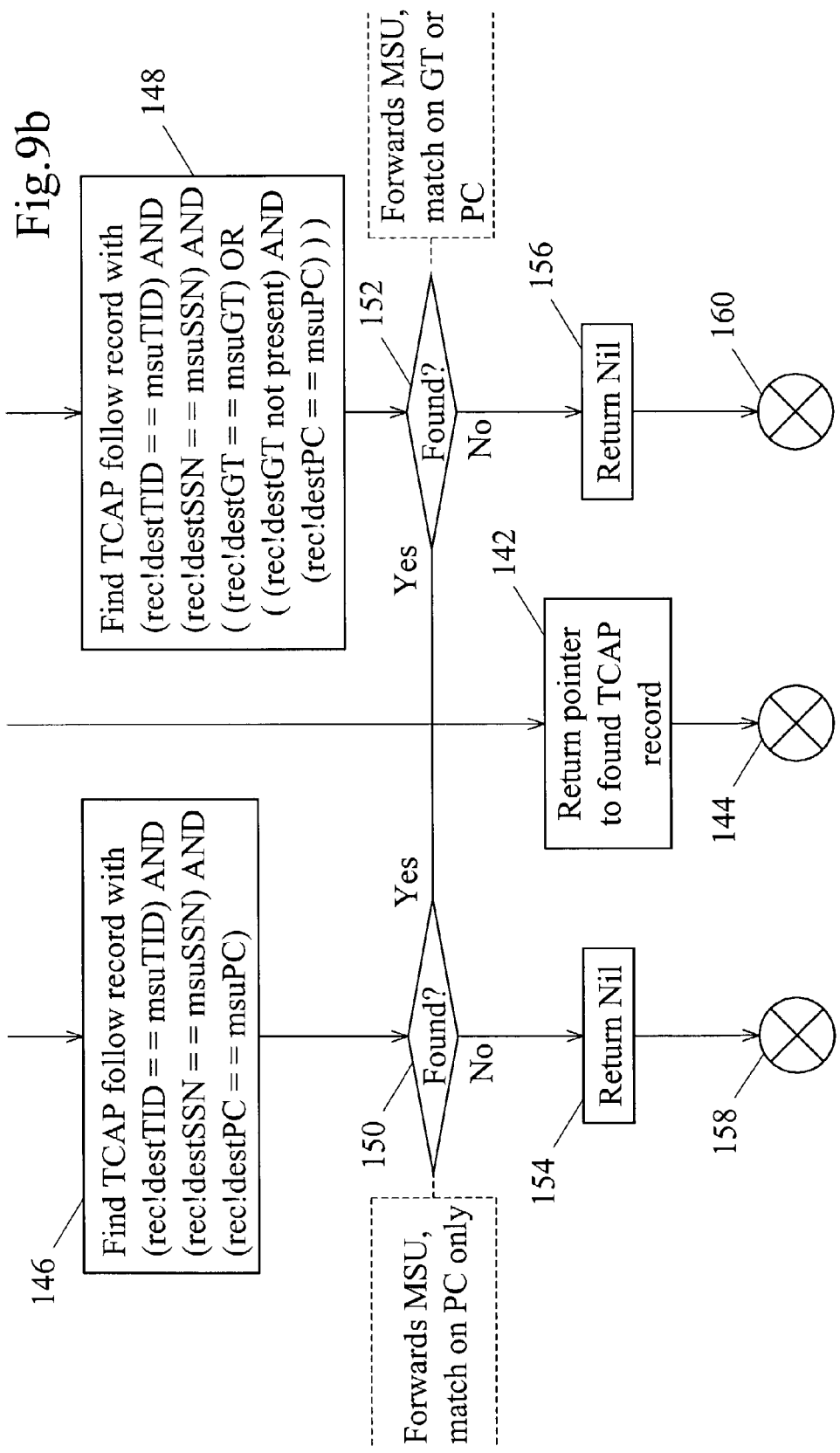

Referring to FIG. 7, in response to occurrence (as indicated at 60) of a TCAP_END MSU, the process calls the FindMatchingTCAPRecord procedure (62) described below with reference to FIGS. 9a and 9b, passing the MSU being processed as a parameter. At 64 the process then tests whether a matching TCAP record was found. If not the process returns at 66 to the awaiting MSU state—either the corresponding TCAP_BEGIN MSU was not observed, or the TCAP_END MSU is spurious. If a matching record was found, then at 68 the information in the TCAP_END MSU defining any CAMEL operation is extracted and the nature of the operation it defines is determined.

If the operation in the TCAP_END is a ReleaseCall then the ReleaseCall indication and the associated release cause are passed to the BuildCDRs process (70). No indication of the TCAP_END itself is passed, as it is assumed in the BuildCDRs process that there will be no more calls controlled by this TCAP transaction after the ReleaseCall operation. If the operation is an EventReportBCSM than an EventReport indication, along with the event type (e.g. o-disconnect) and cause value, are passed to the BuildCDRs process associated with this TCAP transaction (72). In this particular case a TCAP_END indication is also passed after the EventReport indication (74) in order to terminate the BuildCDRs process for this TCAP transaction. This is because no assumption based solely on the event report can be made in BuildCDRs processes about the continuation or otherwise of the TCAP transaction. Any other case of TCAP_END simply causes a TCAP_END indication to be passed to the relevant BuildCDRs process (76). At 78 the TCAP record that has been used to follow the TCAP transaction is discarded, and then the process returns to its awaiting MSU state (80). The TCAP record can be discarded because it has been required only to enable TCAP MSUs to be matched according to their originating and destination addressing and transaction IDs, and to provide a link—established at 54—to the relevant instance of the BuildCDRs process that builds the call related CDR(s) associated with the TCAP transaction.

Still referring to FIG. 7, if a TCAP_ABORT MSU occurs (82), the process calls the FindMatchingTCAPRecord procedure (84). At 86 the process tests whether a matching TCAP record was found, and if not it returns to the awaiting MSU state at 66. If a matching record is found a TCAP_ABORT indication (88) is sent to the instance of the BuildCDRs process associated with this TCAP transaction, to terminate any current CDR being built and to terminate that BuildCDRs instance, the TCAP record is discarded (90), and the process returns to its awaiting MSU state (92).

Figure 8A:
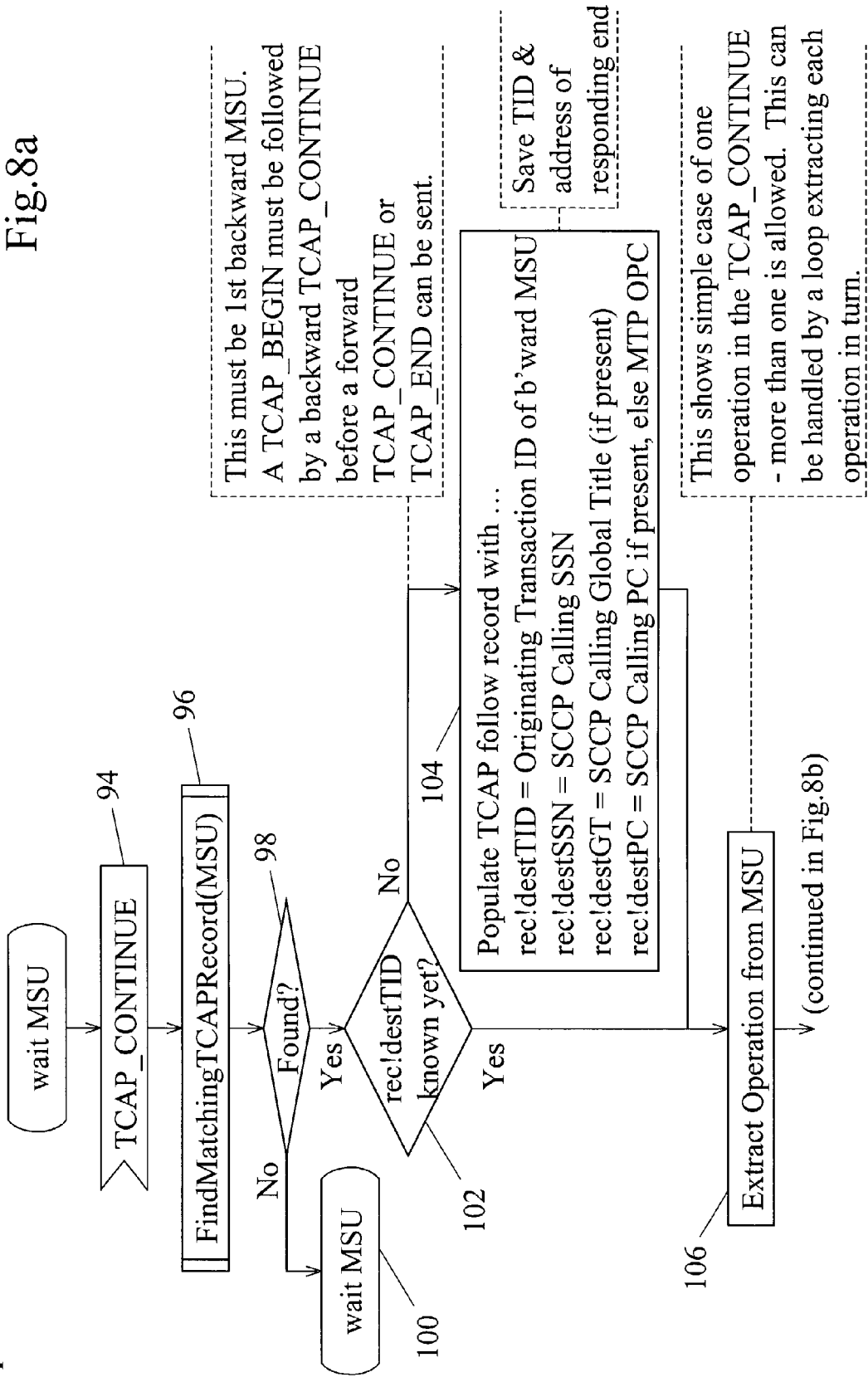
Figure 8B:
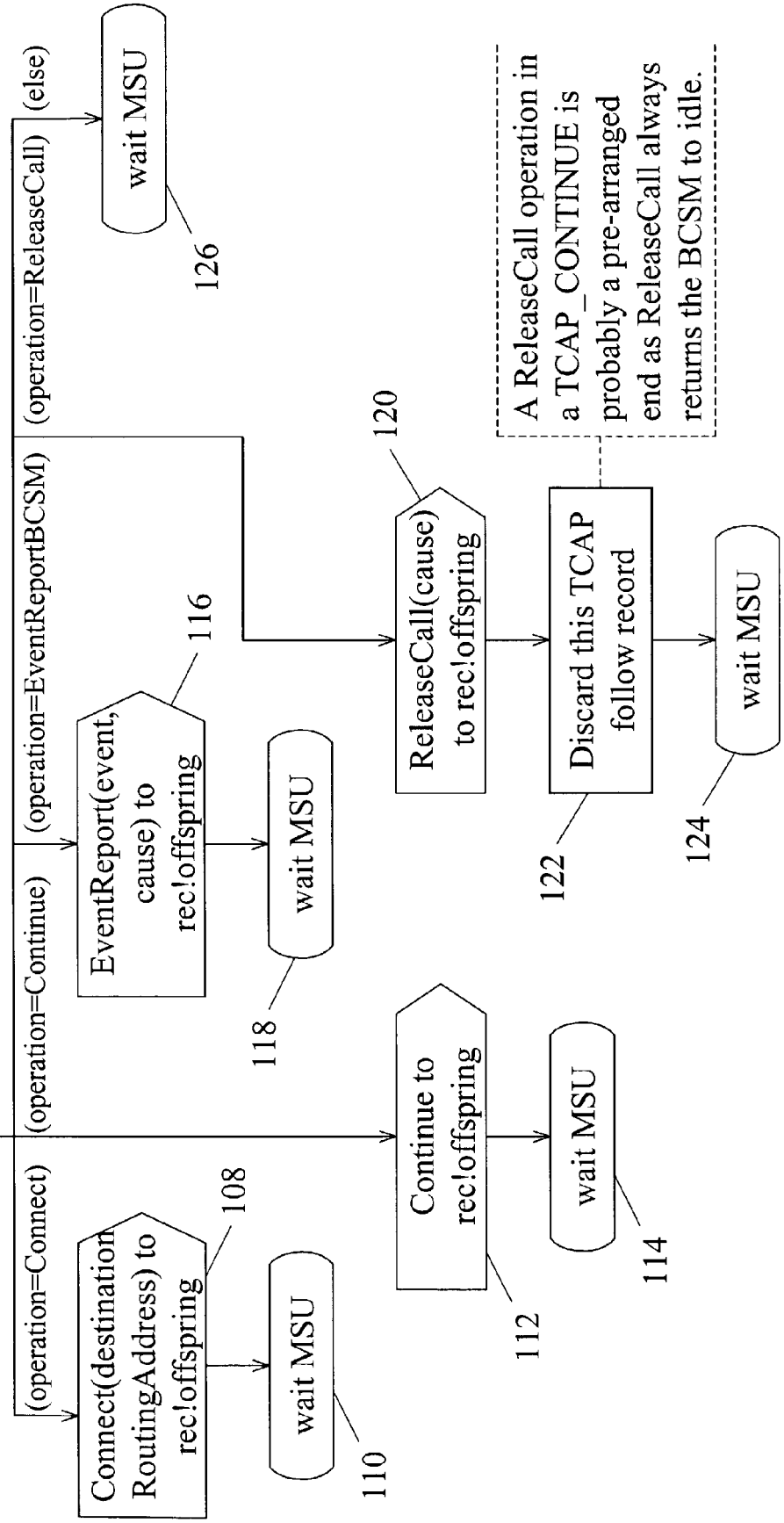

The functions performed by the CorrelateTCAPMSUs process for a TCAP_CONTINUE MSU (such as CAMEL Connect, Continue or ReleaseCall operations) are shown in FIGS. 8a and 8b.

Referring to FIG. 8a, in response to occurrence (as indicated at 94) of a TCAP_CONTINUE MSU the process calls the FindMatchingTCAPRecord procedure (96) and at 98 then tests whether a matching TCAP record was found. If not the process returns at 100 to the awaiting MSU state. Otherwise the process tests if the Transaction ID of the SCF is known yet (102)—that is, if the destTID field in the TCAP record for this TCAP_CONTINUE MSU contains a value. If not then this must be the first backward TCAP_CONTINUE MSU in the transaction. In this case the destination address fields and destTID in the TCAP record are populated (104) from the SCCP calling fields and originating TID in the backward TCAP_CONTINUE MSU. Thereafter, or if the destination TID is found at 102 to be already known, information about the CAMEL operation or operations defined in the MSU is extracted, at 106, and used to determine the action to be taken in respect of this MSU. Referring to FIG. 8b, if the MSU includes a Connect operation, a Continue operation or an EventReportBCSM operation, a corresponding indication of that operation and associated parameters (if any) are passed to the relevant instance of the BuildCDRs process (108, 112, 116 respectively) which is assembling the associated CDR, and the CorrelateTCAPMSUs process returns to its awaiting MSU state (110, 114, 118). If the MSU includes a ReleaseCall operation an indication of this and of the release cause are passed to the appropriate BuildCDRs instance (120), and the TCAP record is discarded (122), as this kind of operation in a TCAP_CONTINUE MSU is likely to be the last MSU of that TCAP transaction. Thereafter, or in the case of any other kind of CAMEL operation or a TCAP_CONTINUE MSU that doesn't contain a CAMEL operation, the process returns to its awaiting MSU state (124, 126).

The FindMatchingTCAPRecord procedure mentioned above is shown in FIGS. 9a and 9b. The purpose of the procedure is to find any existing TCAP record (previously created at the task 48) that matches the MSU passed to the procedure by the calling process. The matching is accomplished by using destination address information extracted from the MSU to search for a TCAP record that has matching originating address information. If such a record is found then the MSU must be a backward MSU. Otherwise the destination address information from the MSU is used to search for a TCAP record with matching destination address information. If found then the MSU must be a forward MSU.

Referring to FIG. 9a, when the FindMatchingTCAPRecord procedure is invoked (as indicated at 128) it first executes a task 130 to extract identifying data from the MSU passed by the calling process. These data are the SCCP called address and destination TID, of either the SCP/SCF 20 if the MSU is a forward MSU or the VMSC/SSF 22 if it is a backward MSU, together with any SCCP called GT that may be present (placed in a local variable named msuGT), and the SCCP called PC, or the MTP destination point code (DPC), of the SS7 equipment (placed in a local variable named msuPC). The procedure then examines the extracted data to determine whether a GT is present in the MSU, at 132. If not the procedure executes a task 134 to locate any existing TCAP record for which the following combination of identities is true:

1. Originating TID in the IDP==Destination TID in the MSU
2. Calling SSN in IDP==Called SSN in MSU
3. Contents of the origPC field (derived from the IDP) ==contents of the msuPC variable.

If at 132 a GT is determined to be present in the MSU, a different task 136 is executed to locate any existing TCAP record which satisfies the following combination of identities:

1. Originating TID in the IDP==Destination TID in the MSU
2. Calling SSN in IDP==Called SSN in MSU
3. Contents of the origGT field (derived from the IDP) ==contents of the msuGT variable, OR the origGT field is empty and the contents of the origPC field=contents of the msuPC variable.

Since the data extracted at the task 130 are for the destination of the TCAP MSU being examined, and they are compared at the tasks 134 and 136 with data extracted at the task 48 for the origin of a TCAP_BEGIN MSU, it follows that if a TCAP record is located which satisfies one of these combinations of identities, the TCAP MSU being examined must be a backward MSU.

When the task 134 or 136 has been completed, a test is performed at 138 or 140, respectively, to determine whether any relevant TCAP record was located. If so a task 142 (FIG. 9b) sets a pointer to the location in memory of that record, and the procedure returns the value of the pointer to the calling process at 144.

If no relevant TCAP record was located, the procedure performs either a task 146 or a task 148 (FIG. 9b), depending on whether a GT was found at 132 to be present in the MSU. The task 146 is similar to the task 134, but it performs a comparison between data from the MSU passed by the calling process and data extracted at the task 104 from the first backward MSU encountered. The task 148 is likewise related to the task 136.

As the data extracted at the task 130 for the destination of the TCAP MSU being examined are compared at the tasks 146 and 148 with data extracted at the task 104 for the origin of a backward TCAP MSU, it follows that if a TCAP record is located which satisfies one of these combinations of identities, the TCAP MSU being examined must be a forward MSU.

When the task 146 or 148 has been completed, a test is performed at 150 or 152, respectively, to determine whether any relevant TCAP record was located. If so the task 142 sets a pointer to the location in memory of that record for return to the calling process at 144. Otherwise respective tasks 154 and 156 set a nil value for the pointer, which is returned to the calling process at 158 or 160.

Figure 10:
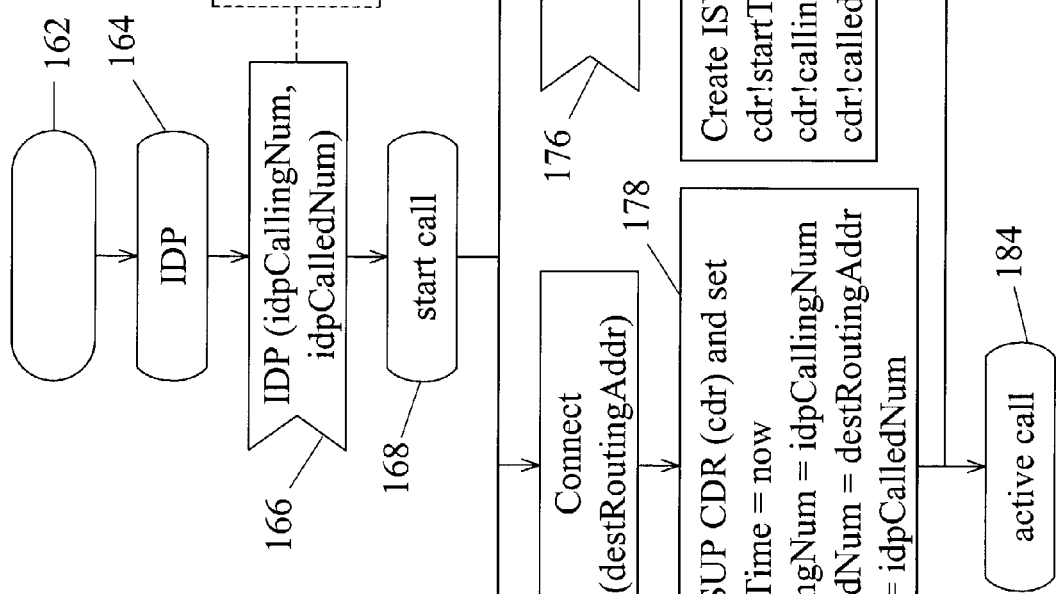
FIGS. 10, 11, 12a and 12b are SDL diagrams defining a CDR building process which is invoked by the TCAP MSU correlation process.

FIGS. 10, 11, 12a and 12b show the BuildCDRs process, instances of which are created and started at 52 in FIG. 6 for the respective TCAP transactions encountered. Referring to FIG. 10, when an instance of the BuildCDRs process is created and started (as indicated at 162) it enters a state 164 waiting for the parameters from the Initial_DP to be passed to it. This is done via the IDP data indication sent by the CorrelateTCAPMSUs process at 56 (FIG. 6) and received by the BuildCDRs instance at 166. The calling and called number parameters are extracted from the IDP indication at 166, and stored as local variables idpCallingNum and idpCalledNum. A start call state 168 is then entered.

If the next indication of an MSU for the current TCAP transaction relates to a ReleaseCall operation (170), or a TCAP_END or TCAP_ABORT MSU, which all indicate a call did not progress (e.g. because the HPLMN did not authorise it), no CDR is created and the process terminates itself at 172.

If the next indication of an MSU relates to a Connect operation (174) or a Continue operation (176), a respective task 178 or 180 is performed to create a call detail record with the structure shown in the declarations at 182. Data needed to construct the CDR, such as the start and end times of the call, the calling and called numbers and (in the case of a Connect operation) a routing address substituted for the original called number (ocn), are stored in the record. Variations to this structure are possible. For example, call duration could be stored instead of call end time.

The process then enters a state indicated at 184 of handling an active call, to await further indications of MSUs relating to the call.

The kinds of MSU which may be indicated after construction of the CDR has begun and while the BuildCDRs process is waiting are those for TCAP_END, TCAP_ABORT, ReleaseCall and EventReportBCSM. The functions performed by the process for indications of TCAP_END, TCAP_ABORT and ReleaseCall MSUs are shown in FIG. 11.

Figure 11:
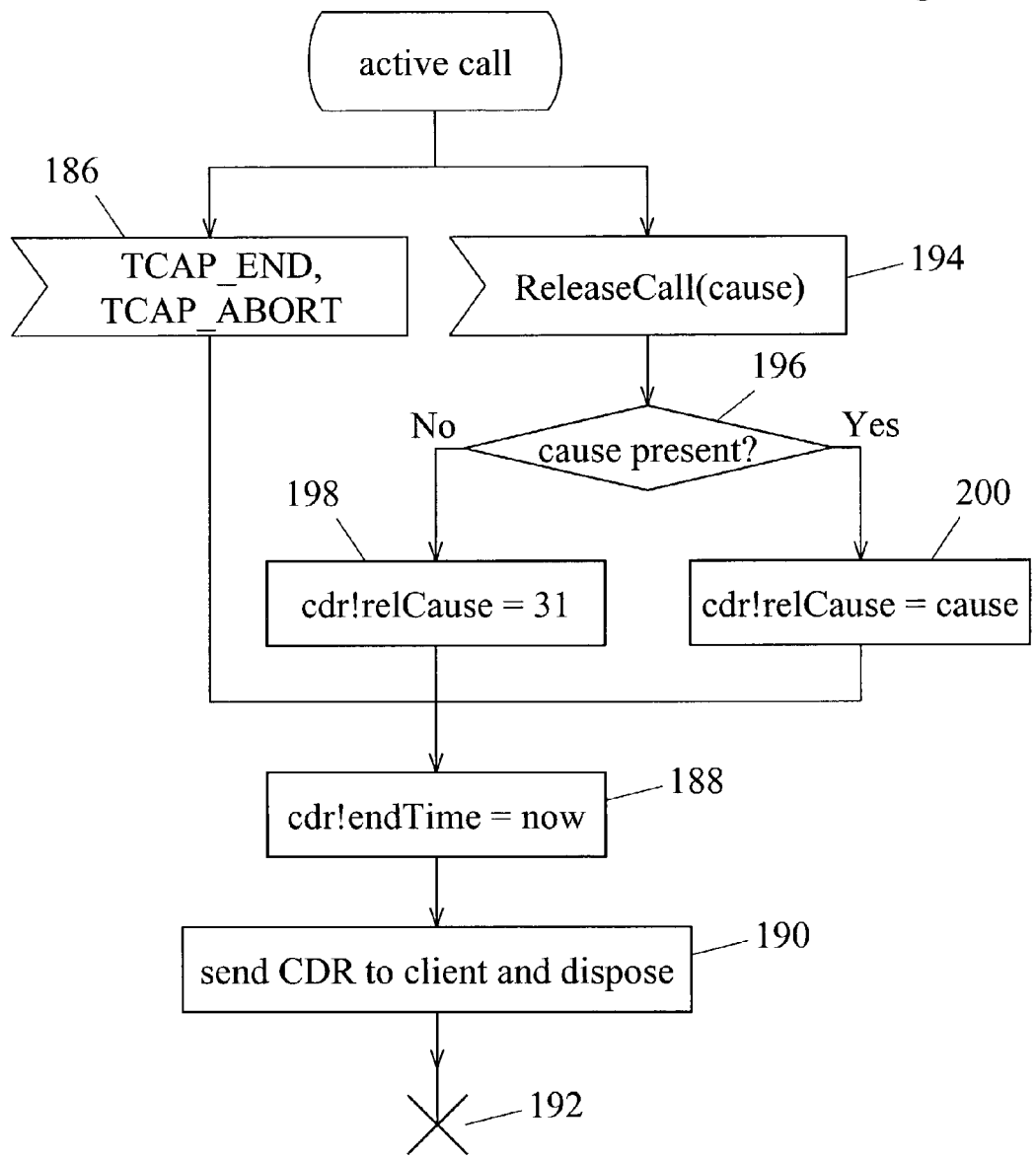

Referring to FIG. 11, in the event of indication of a TCAP_END or TCAP_ABORT MSU (as indicated at 186), the process records the end time of the call in the CDR (188), despatches the completed CDR to a client application (such as for billing verification or fraud management) and releases the resources, such as memory, used to build the CDR (190), and then terminates at 192.

If the MSU is indicated to be a ReleaseCall operation (194), a test is performed at 196 to determine whether a cause code is present. If not, a default code of 31 (normal, unspecified release) is allocated at 198 and stored in the CDR, otherwise the actual cause code is stored in the CDR at 200. In either event, the tasks at 188 and 190 are then performed as described above and the process terminates.

Figure 12A:
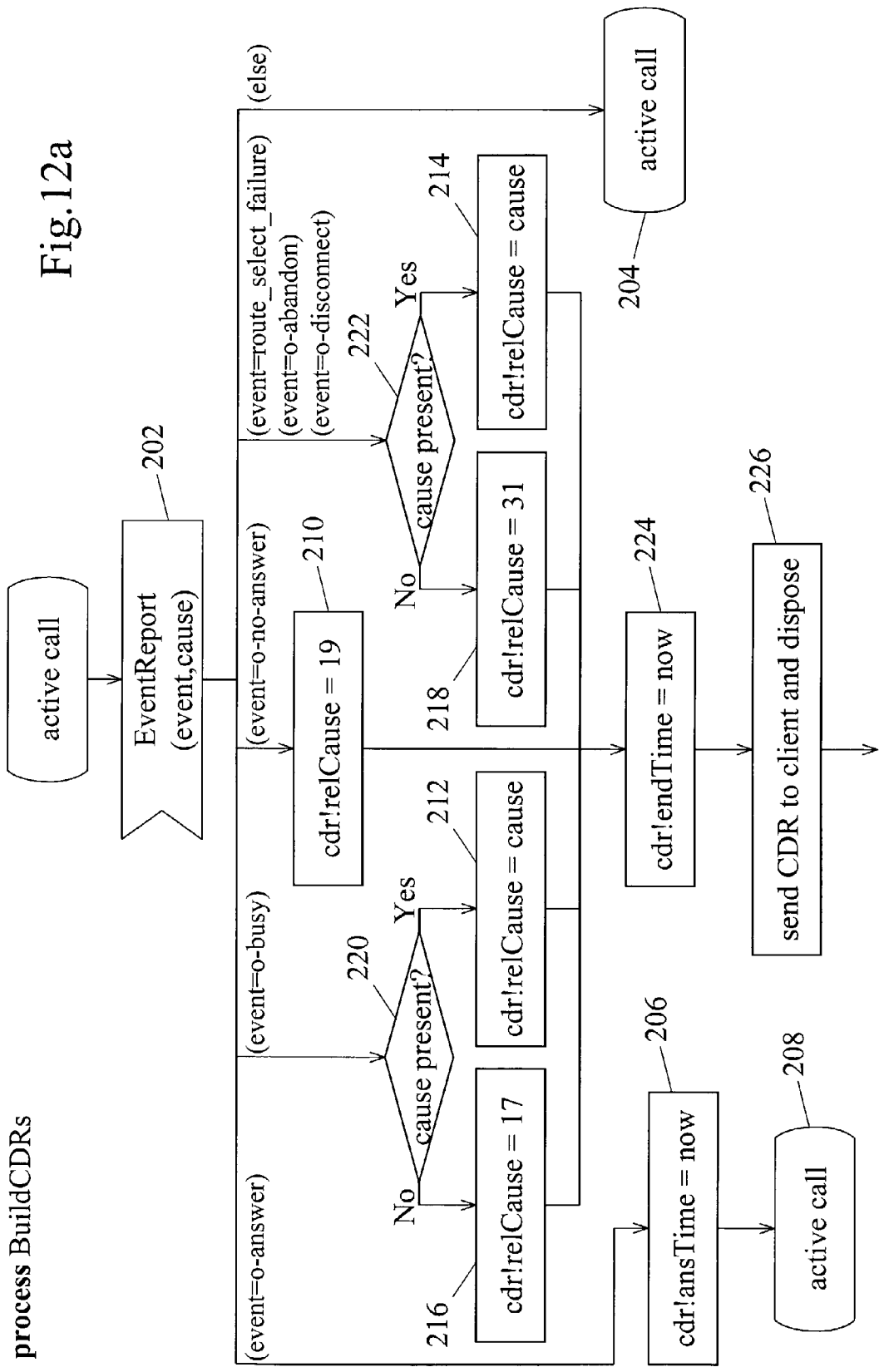
Figure 12B:
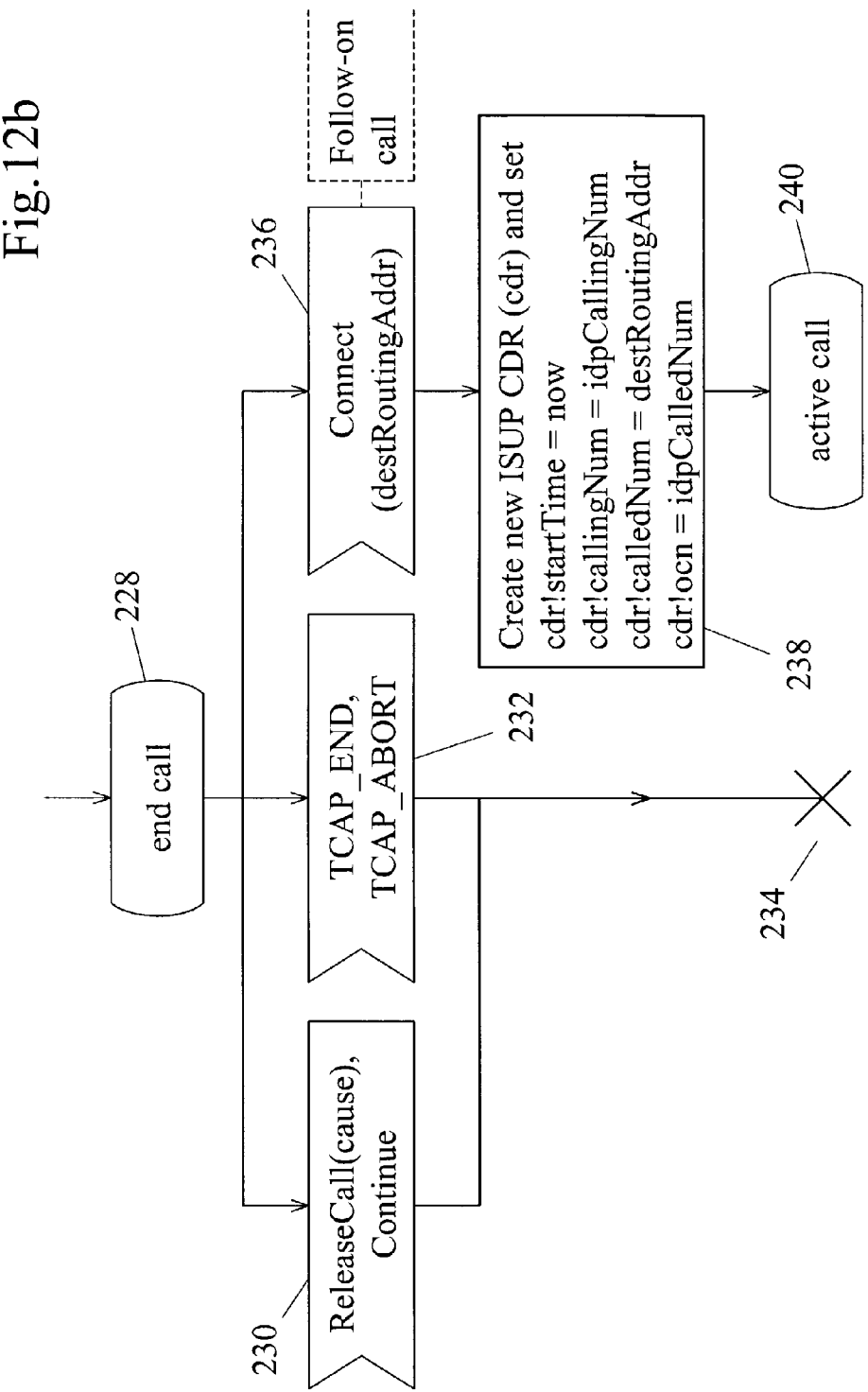

FIGS. 12a and 12b show the handling of an indication of an EventReportBCSM MSU by the BuildCDRs process. Referring to FIG. 12a, when such an MSU is indicated (202) the nature of the event being reported is determined. Specific actions are taken as described below for the following events:

call is answered;
called number is busy;
called number does not answer;
the selected routing for the call fails, the call is abandoned, or the call is disconnected.

For all other kinds of event the process ignores the MSU indication and returns to its handling active call status, to await further indications from the CorrelateTCAPMSUs process (204). If the call is answered, the CDR is updated with the time of answering (206) and the process returns to the handling active call status (208).

For the remaining events listed above the CDR is updated with a cause code indicating the event which has occurred (210–218). For no answer this code is 19 (no answer from user—user alerted). For busy, routing failure, abandonment and disconnection, a test is performed (220, 222) to determine whether the MSU contained a cause code, which is used if it is present (212, 214). Otherwise a default code is used of 17 for busy (216) and 31 for the other events listed (218). Thereafter, as these events (busy, no answer, routing failure, abandonment and disconnection) correspond to termination of the call attempt the end time of the call is recorded in the CDR (224), which is then despatched to the client process and the resources used for building the CDR are released (226). However, it is possible for further MSUs associated with the TCAP connection to be indicated, for completion of clearing down the terminated call or termination of the TCAP connection itself, or for a follow-on MVPN call (see FIGS. 5a to 5c). Accordingly, as shown in FIG. 12b, the BuildCDRs process then enters an end call state 228. If a ReleaseCall, Continue, TCAP_END or TCAP_ABORT MSU is indicated while the process is in this state (230, 232), the process simply terminates at 234. If the MSU is indicated to be a new Connect operation (236), for a follow-on MVPN call, a new CDR is started and initialised with data from the MSU (238) and then the process enters its handling active call status again to await further MSU indications for the new call (240).

A typical CDR produced by the BuildCDRs process contains the following information extracted from the correlated MSUs for the relevant call:

| CDR field | Populated from | Equivalent ISUP |
| --- | --- | --- |
| Call start time | Time of Connect or Continue operation | Time of IAM message |
| Call answer time (if answered) | Time of o-answer BCSM event report | Time of ANM message |
| Call end time | Time of o-disconnect event report, or time of ReleaseCall operation, whichever is first | Time of REL message |
| Calling Party Number | Calling Party Number from Initial_DP | Calling Party Number in the IAM |
| Called Party Number | If Connect operation present in transaction then Destination Routing Address from the Connect, otherwise Called Party Number or Called Party BCD Number (whichever is present) from Initial_DP | Called Party Number in the IAM |
| Original Called Number | If Connect operation present in transaction then Called Party Number or Called Party BCD Number (whichever is present) from the Initial_DP, otherwise not populated | Original Called Number in the IAM |
| Release cause value | Cause value from o-disconnect event report, or Cause value from ReleaseCall operation, whichever occurs first | Cause Value from REL message |

The third column in this table indicates the correspondence between information derived for a CDR in the course of using this invention, for a call set up using CAMEL features, and information that would be obtained by methods for monitoring ISUP messages (e.g. at the SSP 28) such as IAM, ANM and REL for a call routed via the HPLMN.

The invention has been described above in the context of monitoring calls set up using CAMEL features. However, the invention is applicable in other contexts. For example, the Intelligent Network Protocol (INAP) has many similarities to the CAMEL protocol. Accordingly the techniques described above could also be used to assemble a CDR for a call set up using INAP features. For example, this would enable a CDR to be assembled while monitoring SS7 links at an SCP in a wireline network using INAP. An advantage of this is that it would enable CDRs to be generated for the instances of usage of some Intelligent Network services without the necessity of monitoring all SS7 links in the network. Other possible applications of the invention include: monitoring CAP messages (rather than MAP messages) at a Short Message Service (SMS) Centre, to provide CDRs for instances of usage of SMS; and monitoring CAP messages, rather than General Packet Radio Service (GPRS) Attach/Detach or GPRS Context Establishment/Deactivation messages, to provide CDRs for instances of usage of GPRS (for example for a data call or session). In each case the signalling dialogue between an SSF (or similar functionality) and an SCF (or similar functionality) is monitored, rather than the signalling which is directly controlling or implementing the underlying service transport or delivery.

The invention claimed is:

1. A method of generating a call detail record for usage of a telecommunications service established between telecommunications networks, comprising the steps of:

monitoring messages in a signalling system for co-ordinating operation of a first telecommunications network and a second telecommunications network and carried over signalling links in the signalling system between a service switching function (SSF) entity in the first telecommunications network and a service control function (SCF) entity in the second telecommunications network;

selecting messages that relate to instances of usage of a telecommunications service initiated by the SSF entity to a signal switching point (SSP), to yield selected messages;

correlating the selected messages in accordance with the instance of usage to which the selected messages relate, to yield correlated selected messages; and using information in the correlated selected messages to derive a call detail record for the instance of usage of the telecommunications service.

2. The method of claim 1, wherein the signalling system uses Signalling System No. 7 protocols and the selected messages are Transaction Capabilities Application Part (TCAP) messages.

3. The method of claim 2, wherein said correlating of the TCAP messages is performed in accordance with transaction identifiers and identifications of origin and destination of the TCAP messages.

4. The method of claim 1, wherein the telecommunications service provides telecommunications facilities to a mobile telecommunications device.

5. The method of claim 4, wherein the first telecommunications network comprises a home telecommunications network with which the mobile telecommunications device is associated, and the call detail record to be generated relates to usage of the telecommunications service via a visited telecommunications network other than the home telecommunications network.

6. The method of claim 5, wherein the selected messages are exchanged between the visited telecommunications network and the home telecommunications network, and relate to at least one of (a) requests from the visited telecommunications network to the home telecommunications network for instructions on handling service usage originated by the mobile device, or (b) service usage established in response to such instructions.

7. The method of claim 1, wherein the telecommunications service comprises a service selected from the group consisting of a voice service, a data service and a message service.

8. The method of claim 1, wherein said information is carried within the correlated selected messages in accordance with a protocol additional to a protocol used for assembling the correlated selected messages, said information relating to exchange of data between the SSF entity and the SSP.

9. The method of claim 1, wherein the SSP is located in a third telecommunications network.

10. Apparatus for generating a call detail record for usage of a telecommunications service established between telecommunications networks, comprising:

a monitor for monitoring messages in a signalling system for co-ordinating operation of a first telecommunications network and a second telecommunications network and carried over signalling links in the signalling system between a service switching function (SSF) entity in the first telecommunications network and a service control function (SCF) entity in the second telecommunications network;

a message selector for selecting messages that relate to instances of usage of a telecommunications service initiated by the SSF entity to a signal switching point (SSP), to yield selected messages;

a correlator for correlating the selected messages in accordance with the instance of usage to which the selected messages relate, to yield correlated selected messages; and a call detail record generator for using information in the correlated selected messages to derive a call detail record for the instance of usage of the telecommunications service.

11. The apparatus of claim 10, wherein the SSP is located in a third telecommunications network.

* * * * *